United States Patent [19]

Kraus

[11] Patent Number: 4,702,118
[45] Date of Patent: Oct. 27, 1987

[54] HYDRAULICALLY CONTROLLED INFINITELY VARIABLE TRACTION ROLLER TRANSMISSION

[75] Inventor: Charles E. Kraus, Austin, Tex.
[73] Assignee: Excelermatic Inc., Austin, Tex.
[21] Appl. No.: 909,882
[22] Filed: Sep. 22, 1986
[51] Int. Cl.$^4$ .................. F16H 15/08; F16H 15/00
[52] U.S. Cl. .......................... 74/200; 74/193; 74/198; 74/199
[58] Field of Search .................. 74/193, 198, 199, 200

[56] References Cited

U.S. PATENT DOCUMENTS

| 751,958 | 2/1904 | Spencer | 74/200 |
|---|---|---|---|
| 1,853,749 | 4/1932 | Sharpe | 74/200 |
| 3,087,348 | 3/1961 | Kraus | 74/200 |
| 3,163,050 | 12/1964 | Kraus | 74/200 |
| 3,163,051 | 12/1964 | Kraus | 74/200 |
| 3,486,391 | 12/1969 | Kraus | 74/200 |
| 3,828,618 | 8/1974 | Sharpe et al. | 74/200 |
| 4,086,820 | 5/1978 | Kraus et al. | 74/200 |
| 4,464,946 | 8/1984 | Kraus | 74/200 |
| 4,484,487 | 11/1984 | Kraus | 74/200 |
| 4,501,172 | 2/1985 | Kraus | 74/867 |
| 4,526,051 | 7/1985 | Kraus | 74/200 |
| 4,576,055 | 3/1986 | Kraus | 74/200 |

*Primary Examiner*—Leslie Braun
*Assistant Examiner*—Joseph J. Meter

[57] ABSTRACT

An infinitely variable traction roller transmission with preferably four traction rollers arranged between, and in engagement with, opposite toric discs for the transmission of motion therebetween includes, for each roller, a pivotal support member having a roller supported thereon by a hydrostatic or an antifriction bearing including hydraulic fluid adapted to force the roller into motion transmitting engagement with the toric discs. The pivotal support member is supported by antifriction bearing segments or hydrostatic means and has gear segments disposed at opposite ends thereof, with the gear segments of adjacent roller support members being in meshing engagement for transmission ratio changing pivot movement of all the traction rollers in unison.

7 Claims, 3 Drawing Figures

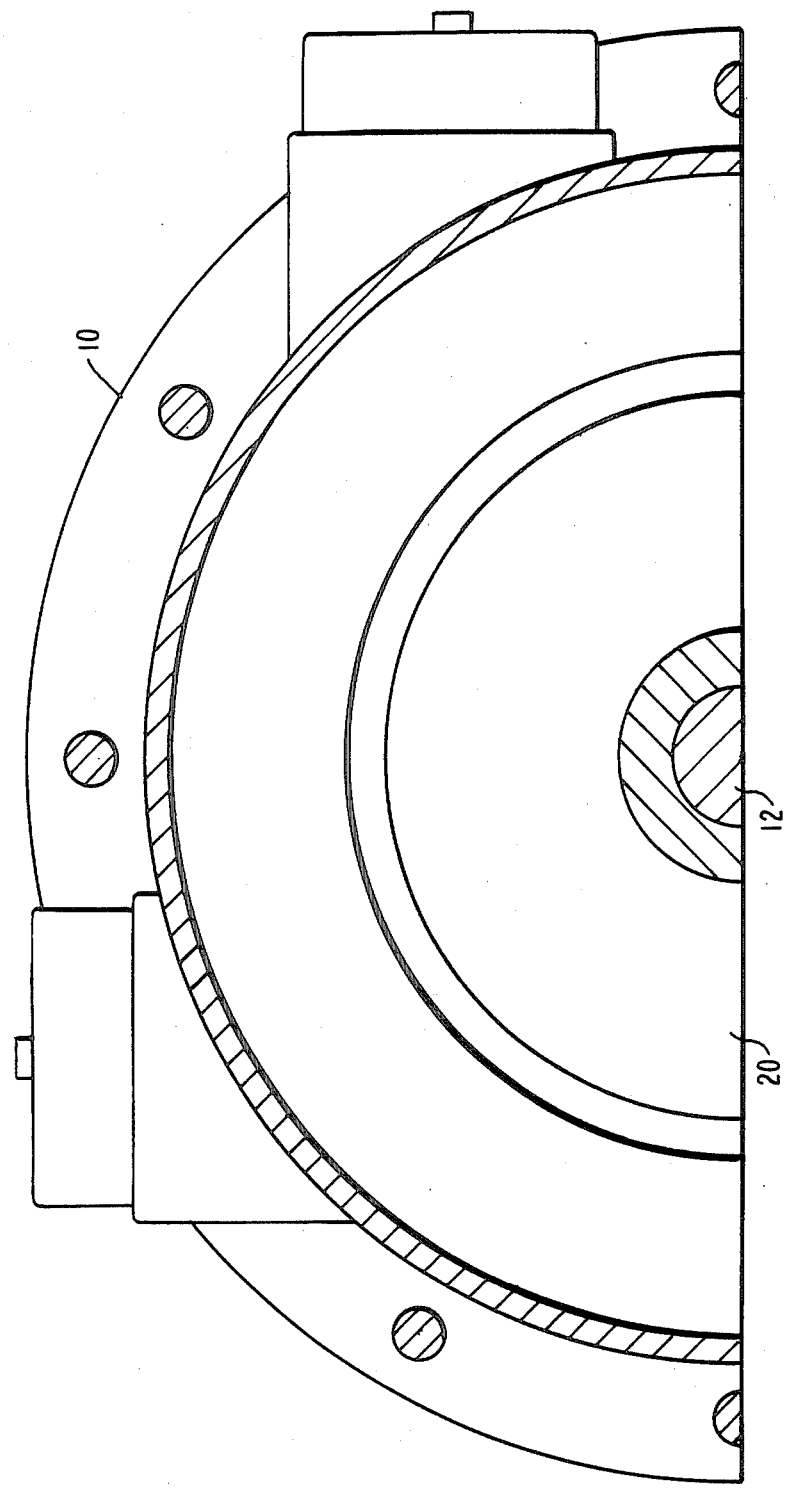

HYDRAULICALLY CONTROLLED INFINITELY VARIABLE TRACTION ROLLER TRANSMISSION

BACKGROUND OF THE INVENTION

The invention relates to an infinitely variable traction roller transmission in which power is transmitted through traction rollers pivotally supported in a housing between toric input and output discs.

In such transmissions, the traction rollers are mounted on support structures which, when pivoted, cause engagement of the traction rollers with the toric discs in circles of varying diameters depending on the desired transmission ratio. The pivotal traction rollers are so supported that they can be moved axially for initiating a change in the transmission ratio. For example, two traction rollers may be supported opposite one another by flexible tension sheets as shown in U.S. Pat. No. 4,086,820 which issued May 2, 1978 to Charles E. Kraus.

However, the forces applied to the traction rollers and, through the traction roller support structure, to the tension sheets are substantial and, consequently require support structure of great strength together with adequate pivot bearings therefor.

In the arrangement according to U.S. Pat. Nos. 4,484,487 and 4,576,055 also assigned to the assignee of the present application, the traction roller support structure is therefore hydraulically supported directly on the housing so that the support structure is not subjected to bending forces. Pivoting of the opposite roller support structures for appropriate transmission ratio positions may be coordinated by an interconnecting ribbon as shown in U.S. Pat. No. 4,086,820, for example.

This arrangement is quite effective and inexpensive for support structures disposed at a given distance from one another but cannot readily be used where the pivoting support structures are floatingly supported as they are in the arrangements shown in U.S. Pat. Nos. 4,484,487 and 4,576,055 since their distance from one another may change somewhat during operation of the transmission.

Also, it is pointed out that the arrangements described in the above patents utilize two traction rollers. For transmission of higher power however, more than two traction rollers, that is, for example, four traction rollers arranged in pairs with two disposed diametrically opposite one another may be provided. With such an arrangement however there is no room for tension sheet supports nor for coordinating ribbons or ropes in the transmission since they would all interfere with one another.

SUMMARY OF THE INVENTION

In order to firmly support and provide for coordinated pivoting of all the traction rollers in an infinitely variable traction roller transmission, the arrangement according to the invention which includes preferably four traction rollers arranged between and in engagement with opposite toric traction discs for the transmission of motion therebetween, includes for each traction roller a pivotal support member on which a roller support is disposed and supported by a hydrostatic lift bearing structure adapted to force the roller into motion transmitting engagement with the toric discs. The pivotal support member is pivotally supported with respect to the transmission housing by means of antifriction bearing segments disposed at opposite ends thereof and gear segments are mounted on the opposite ends of each support member and have gear structures projecting toward the space between adjacent rollers with the gear structures of adjacent roller support members being in meshing engagement for transmission ratio changing pivot movement of all traction rollers in unison.

SHORT DESCRIPTION OF THE DRAWINGS

FIG. 2B is another part of a cross-sectional view along line II—II of FIG. 1.

DESCRIPTION OF A PREFERRED EMBODIMENT

Figure 1:
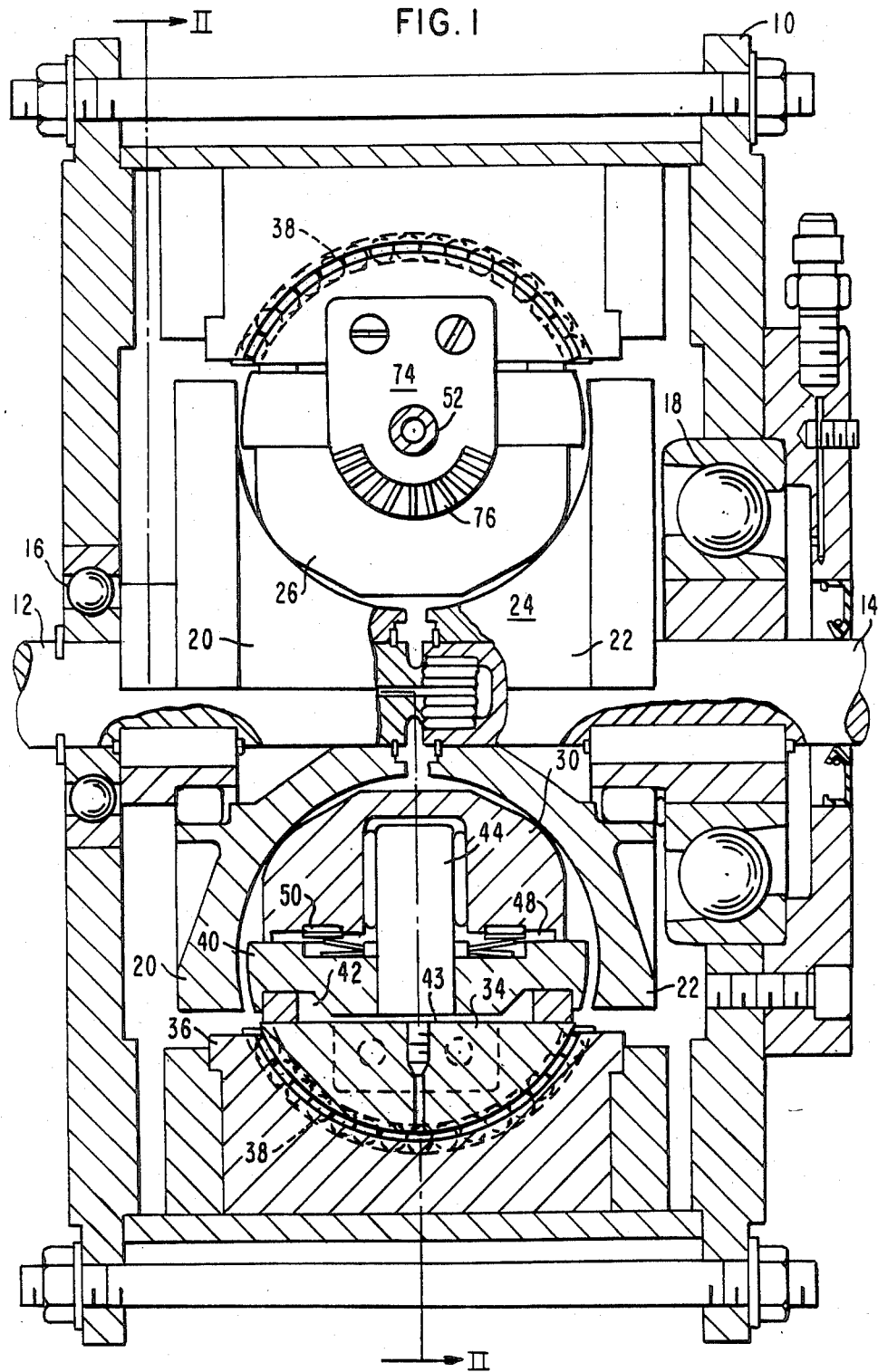
FIG. 1 is an axial cross-sectional view of the traction roller transmission.

A traction roller transmission as shown in FIG. 1 consists of a housing 10 having coaxial input and output shafts 12 and 14 rotatably supported therein by bearings 16 and 18. Associated with the input and output shafts 12 and 14 are toric traction discs 20 and 22 which are so arranged opposite each other that a toric cavity 24 of circular cross-section is defined therebetween. Within the toric cavity 24 traction rollers 26, 28, 30 and 32 (see also FIG. 2) are rotatably supported and are in engagement with the toric traction discs 20 and 22 for the transmission of motion between the discs 20 and 22. The rollers 26, 28, 30 and 32 are supported in the housing 10 by a pivotal support member 34 which is disposed on a pivot base 36 mounted in, or formed integral with, the housing 10 behind each pivotal support member 34. A hydrostatic support bearing as shown, for example, in U.S. Pat. No. 4,576,055 is formed, or antifriction bearing segments 38 are disposed, between the pivotal support member 34 and the pivot base 36 to facilitate pivoting of the pivotal support member 34 on the pivot base 36 for the setting of different transmission ratios. The roller support member 40 is floatingly supported on a pivotal support member 34 during operation of the transmission by a pressurized hydraulic fluid supplied to a hydrostatic support bearing structure 42 formed between the roller support member 40 and the pivotal support member 34. The roller support member 40 carries a shaft stud 44 on which the traction roller 30 is rotatably supported by way of a needle bearing 46. Between the roller support member 40 and the roller 30 there is provided a hydrostatic axial thrust bearing structure 48 as well as an auxiliary antifriction bearing 50 adapted to prevent damage to the traction rollers 50 when they are rotated without sufficient hydrostatic fluid in the hydrostatic axial thrust bearing 48.

Pressurized fluid is supplied to the support bearing structure 42 by means of a hollow push rod 52 which is connected at one end to the roller support member 40 and has a control piston 54 disposed at its other end, the piston 54 being movable in a cylinder 56 mounted on the housing 10. The support member 40 is floatingly supported on the pivotal support 34 by the pressurized fluid in the hydrostatic bearing 42 so that the support member 40 is easily movable on the flat surface 43 of the support 34 by the control piston 54 to provide for precess movement of the roller 30 for changing the transmission ratio. Pressurized fluid is supplied to the cylinder cavity 58 through inlet 60, the pressure of the fluid being variable depending on the torque being transmitted through the transmission. A return spring 62 is provided on the opposite side of the piston 54 to return the piston to a normal non-precess position when, after application of an increased pressure, the transmission ratio has changed and the corresponding greater reaction torque forces are being compensated for. A check valve 64 may be provided in the passage through the push rod 52 to prevent rapid pressure and force oscillations thereby providing only for flow to the bearing 42. Controlled release flow is provided for by a bleed orifice 66. The pressure in the bearing 42 accordingly depends on the torque transmitted through the transmission and the traction roller 30 is forced into engagement with the traction discs only with the force as required for the transmission of the respective torque. A control arrangement for providing fluid of the adequate pressure is described for example in applicant's U.S. Pat. Nos. 4,464,946, 4,501,172 and 4,526,051. Fluid supply to the hydrostatic axial thrust bearing 48 is independent, a measured flow of high pressure fluid being utilized for this bearing as it is common for limited leakage seal type axial thrust bearings. The fluid is supplied to the bearing 48 by way of a supply line 68 which includes a ring line 70 around the push rod 52. The supply line 68 also includes a slide connection 72 to accommodate the movements of the support member 40. Alternatively, a flexible pressure hose connection may be provided. Both fluid supplies, the push rod 52 and the line 68, are arranged in the pivot axis of the traction roller and its support structure, that is, they are coincident with the axis of rotation of the bearing sections 38.

The ratio control of such transmissions is well known and reference is made to U.S. Pat. No. 4,484,487 for a detailed description of the operation of such transmissions. However, it is generally desirable that the various roller supports are interconnected to insure their operation in unison.

In the arrangement according to the present invention, there are provided gear segments 74 which are mounted to the sides of the pivotal support members and are provided with a bevel gear structure 76 which is in engagement with the bevel gear structure of the gear segments of the pivotal support members of the adjacent rollers. As shown in the drawings, four traction rollers and the respective support structures are utilized. With the relative sizes as shown, four traction rollers provide for about full utilization of the toroidal space between the toric traction discs. However, three traction rollers may be utilized with the respective gear segments of each roller support structure in engagement with those of the two adjacent roller support structures.

The gear interfacing of the roller support structures is possible because the traction roller support structure is not radially movable relative to the housing, that is, relative to the adjacent traction roller support structures but only pivotable together with the adjacent support structures. Only the roller support member 40 together with the roller 30, that is, all the rollers 26-32, are movable toward the center of the transmission for firm engagement of the traction rollers with the traction discs. Since the support of the roller support members is by a pressurized fluid, vibrations of the roller are only vaguely transmitted to the pivotal support member 34 and the gear segments 74.

Figure 2A:
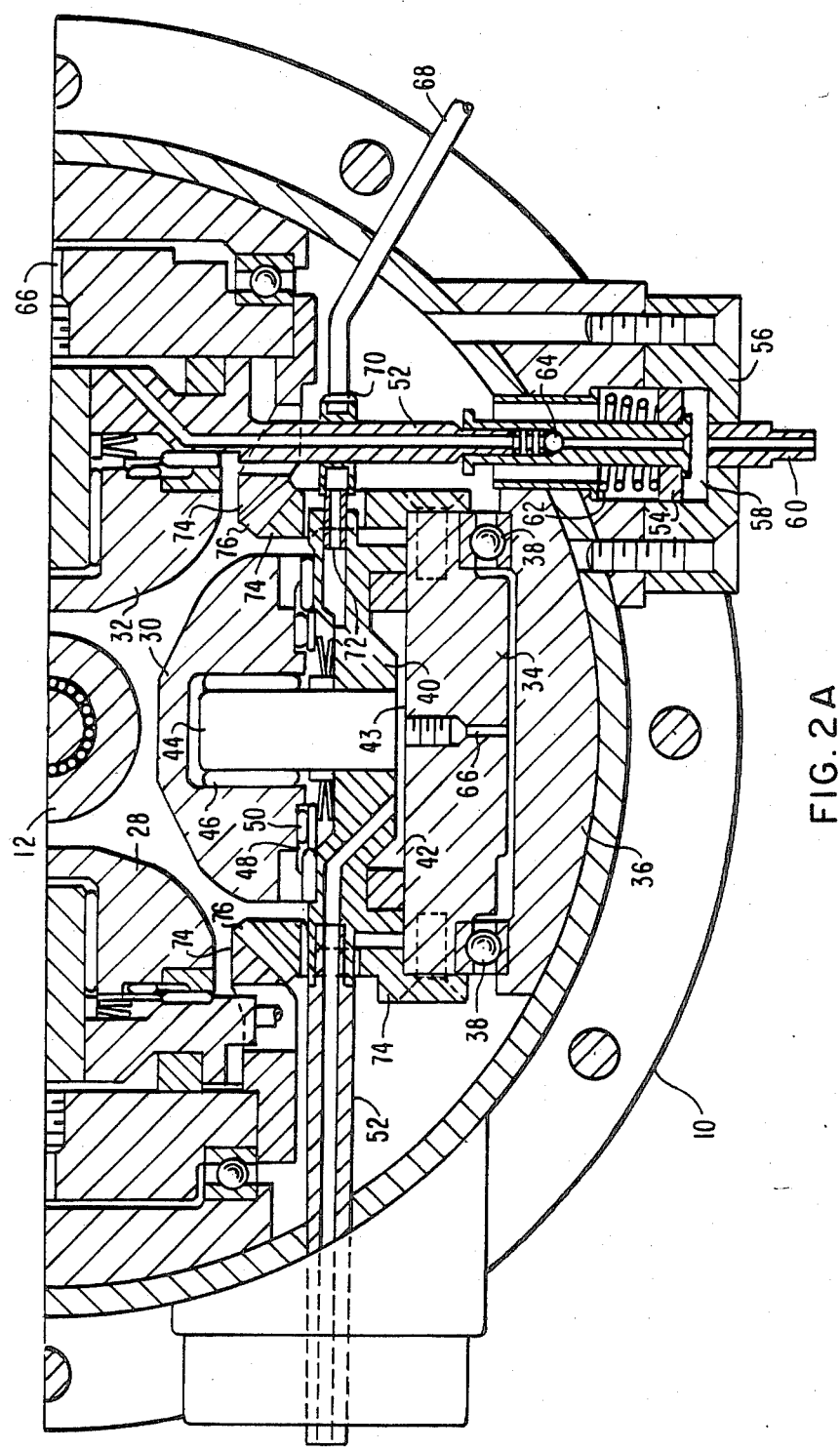
FIG. 2A is one part of a cross-sectional view along line II—II of FIG. 1.

It is pointed out that, as best shown in FIG. 2, the hydrostatic support bearing structure 42 for the roller support member 40 is formed somewhat off-center to compensate for the torque forces generated during power transmission of the rollers since the traction forces are applied in a plane defined by the circle of contact of the traction roller with the traction discs and the control piston forces are effective along the pivot axis of the traction roller which are spaced somewhat from the plane of the traction rollers contact circle.

With the arrangement according to the invention, that is, particularly with a four traction roller arrangement, large torques can be transmitted with transmissions of relatively small volume and cooperation of all the traction rollers is obtained in a relatively simple manner with a gear arrangement that is not subject to vibration and which is not subject to undesired relative movements which might cause early failure and incorrect engagement of the gear structure.

What is claimed is:

1. An infinitely variable traction roller transmission comprising: a housing; coaxial input and output shafts rotatably supported in said housing; two toric traction discs supported opposite each other, one by said input and the other by said output shaft, said toric discs having opposite toric traction surfaces defining therebetween a toric cavity of circular cross-section; at least two motion transmitting traction rollers arranged in said toric cavity in radial symmetry and in engagement with said toric discs for the transmission of motion therebetween, each of said traction rollers being rotatably supported in said housing by a support structure including a pivotal support member supported in said housing pivotally about an axis which is tangential to the center circle of said toric cavity and a roller support member rotatably supporting said traction roller and being supported on said pivotal support member by a hydrostatic bearing structure adapted to force said traction roller into firm engagement with said traction discs, the pivotal support member of each of said traction roller support structures having gear sections mounted thereon with the gear sections of the pivotal support members of angularly adjacent rollers being in meshing gear engagement for cooperating ratio changing pivotal movement of all the traction rollers in the transmission.

2. A traction roller transmission according to claim 1, wherein said pivotal support member is pivotally supported in said housing on a pivot base by antifriction bearing sections having a center of rotation coincident with the pivot axis of said traction roller support member.

3. A traction roller transmission according to claim 2, wherein said pivotal support member has a flat bearing face and said roller support member has a hydro-static bearing structure formed therein adjacent the flat bearing face of said pivotal support member, and said traction roller is rotatably supported on said roller support member, said hydrostatic bearing structure being adapted to be pressurized in order to force said traction roller into engagement with said toric traction discs.

4. A traction roller transmission according to claim 3, wherein a push rod is connected to said roller support member and extends therefrom along the pivot axis of said traction roller, said push rod having at its free end a control piston disposed in a precess cylinder associated with said housing and wherein means are provided for supplying pressurized fluid to said cylinder for imparting a precess motion to said traction roller for the initiation of a change of the transmission ratio.

5. A traction roller transmission according to claim 4, wherein a return spring is provided so as to be effective in a direction opposite to that of the force provided by the pressurized fluid in said cylinder and wherein said push rod is hollow and provides communication between said cylinder and said hydrostatic bearing structure thereby to provide for the same fluid pressure in said cylinder and said hydrostatic bearing structure.

6. A traction roller transmission according to claim 5, wherein the center point of the bearing area of said hydrostatic bearing structure is slightly spaced from the traction roller axis and displaced toward the push rod in order to compensate for the torque generated by traction forces on the traction roller and the corresponding push rod force applied by said control piston.

7. A traction roller transmission according to claim 1, wherein said transmission includes four traction rollers arranged between said toric discs in radial symmetry, that is, in 90 degree intervals, and said gear sections project inwardly toward the spaces between two adjacent rollers and have bevel gear structures in engagement with one another for the pivoting of all four traction rollers in unison.

* * * * *